US008147953B2

(12) United States Patent
Kitahara et al.

(10) Patent No.: US 8,147,953 B2
(45) Date of Patent: Apr. 3, 2012

(54) LAMINATE AND PROCESS FOR PRODUCING THE SAME

(75) Inventors: Shizuo Kitahara, Tokyo (JP); Tetsuya Toyoshima, Tokyo (JP); Kouichirou Maeda, Tokyo (JP); Junji Kodemura, Tokyo (JP); Yutaka Katoh, Tokyo (JP)

(73) Assignee: Zeon Corporation, Tokyo (JP)

( * ) Notice: Subject to any disclaimer, the term of this patent is extended or adjusted under 35 U.S.C. 154(b) by 912 days.

(21) Appl. No.: 10/540,377

(22) PCT Filed: Jan. 20, 2004

(86) PCT No.: PCT/JP2004/000403
§ 371 (c)(1),
(2), (4) Date: Jul. 12, 2005

(87) PCT Pub. No.: WO2004/065119
PCT Pub. Date: Aug. 5, 2004

(65) Prior Publication Data
US 2006/0127655 A1    Jun. 15, 2006

(30) Foreign Application Priority Data

Jan. 20, 2003   (JP) ................................ 2003-011686
Jan. 20, 2003   (JP) ................................ 2003-011687
Apr. 28, 2003   (JP) ................................ 2003-123205

(51) Int. Cl.
*B32B 15/04*   (2006.01)
*B32B 15/06*   (2006.01)
*B32B 15/085*  (2006.01)
*C23C 16/00*   (2006.01)

(52) U.S. Cl. ........ 428/334; 428/332; 428/457; 428/461; 428/462; 428/521; 427/248.1; 427/249.1; 427/250

(58) Field of Classification Search ........................ None
See application file for complete search history.

(56) References Cited

U.S. PATENT DOCUMENTS

| 3,024,211 | A | * | 3/1962  | Daly .............................. 524/525 |
| 3,393,176 | A | * | 7/1968  | Vervloet ........................ 525/236 |
| 3,682,693 | A | * | 8/1972  | Khelghatian et al. ......... 428/461 |
| 4,424,267 | A | * | 1/1984  | Kondo et al. ................... 430/66 |
| 4,508,877 | A |   | 4/1985  | Todoko et al. |
| 4,687,680 | A | * | 8/1987  | Narui et al. .................... 427/525 |
| 5,827,615 | A | * | 10/1998 | Touhsaent et al. ............. 428/463 |
| 6,472,081 | B1| * | 10/2002 | Tsai et al. ...................... 428/457 |
| 6,649,279 | B2| * | 11/2003 | Migliorini et al. ............. 428/626 |
| 6,723,431 | B2| * | 4/2004  | Mallory et al. ................ 428/418 |
| 7,267,887 | B2| * | 9/2007  | Kitahara et al. ............... 428/521 |

FOREIGN PATENT DOCUMENTS

| GB | 1144099 A      | 3/1969  |
| JP | 50-61469 A     | 5/1975  |
| JP | 50-72702 A     | 6/1975  |
| JP | 52-39672 B     | 10/1977 |
| JP | 57-145103 A    | 9/1982  |
| JP | 59-13237 A     | 1/1984  |
| JP | 63-114636 A    | 5/1988  |
| JP | 8-104977 A     | 4/1996  |
| JP | 11-58587 A     | 3/1999  |
| JP | 2000-117881 A  | 4/2000  |
| JP | 2001-49433 A   | 2/2001  |
| JP | 2001-310412 A  | 11/2001 |
| JP | 2002-225170 A  | 8/2002  |
| JP | 2003-4526 A    | 1/2003  |
| JP | 2003-11255 A   | 1/2003  |
| WO | WO-03/033255 A1| 4/2003  |
| WO | WO-03/035786 A1| 5/2003  |

OTHER PUBLICATIONS

Database WPI Week 200349, Thomson Scientific, London, GB; JP 2003-004526A; AN 2003-516314, XP002540942 (Jan. 8, 2003).
Database WPI Week 199550, Thomson Scientific, London, GB; JP 07-106610B; AN 1995-391338, XP002540943 (Nov. 15, 1995).
Database WPI Week 200354, Thomson Scientific, London, GB; JP 2003-011255A; AN 2003-572329, XP002540944 (Jan. 15, 2003).
Database WPI Week 199016, Thomson Scientific, London, GB; JP 02-069545A; AN 1990-119719, XP 002540945, (Mar. 8, 1990).
European Search Report dated Aug. 19, 2009.
Partial English Translation of Japanese Office Action Issued on Oct. 7, 2008.
Partial English Translation of JP-63-114636-A, May 19, 1988.
Partial English Translation of JP-2003-4526-A, Jan. 8, 2003.
Partial English Translation of JP-52-39672-B, Oct. 6, 1977.
Partial English Translation of JP-59-13237-A, Jan. 25, 1984.
Partial English Translation of JP-50-72702-A, Jun. 16, 1975.
Partial English Translation of JP-2002-225170-A, Aug. 14, 2002.
Partial English Translation of JP-2003-011255-A, Jan. 15, 2003.

* cited by examiner

*Primary Examiner* — Monique Jackson
(74) *Attorney, Agent, or Firm* — Birch, Stewart, Kolasch & Birch, LLP

(57) ABSTRACT

An object of the invention is to provide a laminate which is good in adhesiveness between a substrate and a thin film laminated thereon by a dry film-forming method such as a chemical vapor growth method or a vacuum evaporation method even if the substrate is a polymer substrate made of a nonpolar polymer; and a process for producing the same. In order to attain the above-mentioned object, the invention provides a laminate comprising a polymer substrate, a primer layer comprising a cyclized rubber which is a conjugated diene polymer cyclized product or a derivative thereof, the layer being formed on the surface of the polymer substrate, and a thin film laminated on the surface of the primer layer by a dry film-forming method; and a process for producing the same.

10 Claims, No Drawings

LAMINATE AND PROCESS FOR PRODUCING THE SAME

TECHNICAL FIELD

The present invention relates to a laminate and a process for producing the same, more specifically, a laminate which is good in adhesiveness between its substrate and its thin film laminated thereon by a dry film-forming method such as a chemical vapor growth method or a vacuum evaporation method even if the substrate is a polymer substrate made of a nonpolar polymer; and a process for producing the same.

BACKGROUND ART

Hitherto, metal vapor deposited products, in which metal is vapor-deposited on plastic products, have widely been used as food containers and others since they have good decorative property, gas barrier property and light blocking property, and laminate films each obtained by vapor-depositing a silicon oxide film on a plastic film have been used for wrapping materials and others that have transparency and a high gas barrier property.

However, when they are made using, as a starting material thereof, a nonpolar polymer such as polypropylene resin or polyethylene resin, there arise problems that the adhesiveness between the polymer and a thin film vapor-deposited thereon is poor and the film is easily peeled.

In order to solve such problems, there is known a method of subjecting a plastic molded body or plastic film surface to physically surface-roughening treatment by corona discharge, flame radiation, radioactive ray radiation or the like and using anchor effect based on this treatment to improve the adhesiveness of the roughened surface to a thin film vapor-deposited. There is also known a method of applying a polar polymer such as polyester resin or polyamide resin onto the roughened surface and then vapor-depositing a metal thereon. However, even if such methods are used, the adhesiveness of the vapor-deposited thin film is insufficient.

Suggested is also a method of incorporating an additive into a plastic material, thereby improving the adhesiveness of the plastic to the film vapor-deposited thereon. Examples thereof include a method of incorporating, into polypropylene, a maleic anhydride modified polypropylene in which maleic anhydride is graft-polymerized (Japanese Patent Application Laid-Open (JP-A) No. 50-61469, and a method of incorporating magnesium oxide and magnesium silicate into a crystalline propylene-α-olefin copolymer (JP-A No. 8-104977).

However, according to these methods, it is difficult to disperse the additive uniformly. Consequently, unevenness is easily generated in the adhesiveness between the plastic material and the vapor-deposited film, and further the adhesiveness of the vapor-deposited thin film is unsatisfactory.

Meanwhile, attention has been paid to an amorphous carbon film as one of the above-mentioned thin films in recent years. The amorphous carbon film is an amorphous carbon film which does not clearly exhibit any crystal structure by X-ray analysis thereof, or a hydrogenated carbon film in which hydrogen is bonded to nonbonding hands of carbon, and is called an a-C:H film, an i-C film or a diamond-like carbon (DLC) film also.

The amorphous carbon film has a high hardness (Hv: 3000 or more), a good abrasion resistance, a good surface smoothness, a small abrasion coefficient, a good releasability, good chemical resistance/corrosion resistance, a good gas barrier property against oxygen, water vapor and other gases, a good transmittance to near infrared rays, a good electric non-conductance, and other physical properties close to those of diamond. Conditions for the film-formation thereof are simpler than conditions for that of diamond thin films; therefore, expectations that the amorphous film is used as a surface-treatment film for various substrates have been increasing.

Hitherto, as a method for forming an amorphous carbon film, for example, the following has been known: a method of gasifying a raw material containing carbon atoms in a vacuum by high heat so as to form an amorphous carbon film on a surface of a substrate. However, this method has a problem that the substrate is limited to a material having a high heat resistance, such as a metal or a ceramic, since the high heat is applied to the substrate.

In recent years, dry process technique for forming an amorphous carbon film has been advancing so as to make film-formation at low temperature possible. Thus, the application of the technique to surface treatment of polymer substrates has been advancing.

For example, JP-A No. 11-58587 discloses a laminate film having a gas barrier property in which an amorphous carbon film 0.1 µm in thickness is formed on a film made of polyethylene terephthalate; and JP-A No. 2001-49433 discloses a laminate in which an amorphous carbon film 2-3 µm in thickness having a high hardness and transparency is formed on a surface of a polar polymer such as polycarbonate or polymethyl methacrylate. However, in the case of using a nonpolar polymer such as polypropylene as a polymer substrate, the adhesiveness between this polymer substrate and an amorphous carbon film is poor to cause a problem that the film is easily peeled although the adhesiveness between the polymer as described above and the amorphous carbon film is relatively good.

For example, JP-A No. 2000-117881 discloses a gas barrier laminate in which an amorphous carbon film of 0.025 µm thickness is formed on an inside face of a container made of polypropylene; and JP-A No. 2001-310412 discloses a gas barrier laminate film in which an amorphous carbon film of 0.04 µm thickness is formed on a polyethylene film or a polypropylene film. These laminates have problems that the adhesiveness between the polymer substrate and the amorphous carbon film is poor, and further when the film thickness of the amorphous carbon film to be formed is desired to be made large, internal stress of the amorphous carbon film becomes large so that the film is easily peeled.

DISCLOSURE OF THE INVENTION

In light of the above-mentioned situations, the present invention has been made, and an object thereof is to provide a laminate which is good in adhesiveness between its substrate and its thin film laminated thereon by a dry film-forming method such as a chemical vapor growth method or a vacuum evaporation method even if the substrate is a polymer substrate made of a nonpolar polymer, and a process for producing the same.

The inventors have repeated eager researches to solve the above-mentioned problems, so as to find out that the adhesiveness between a polymer substrate and a thin film thereon by a dry film-forming method can be remarkably improved by forming a primer layer containing a cyclized rubber on a surface of the polymer substrate or using a polymer substrate in which a cyclized rubber is incorporated into a polymer-molding material. Based on this finding, the present invention has been accomplished.

Accordingly, according to the present invention, the following invention aspects 1 to 25 are provided:

1. A laminate comprising: a polymer substrate; a primer layer comprising a cyclized rubber which is a conjugated diene polymer cyclized product or a derivative thereof, the layer being formed on the surface of the polymer substrate; and a thin film laminated on the surface of the primer layer by a dry film-forming method.
2. The laminate in which the weight-average molecular weight of the cyclized rubber is from 1,000 to 1,000,000.
3. The laminate in which the cyclization ratio of the cyclized rubber is 10% or more.
4. The laminate in which the amount of gel in the cyclized rubber is 10% or less by weight.
5. The laminate in which the content of the cyclized rubber in the primer layer is 10% or more by weight.
6. The laminate in which the derivative of the conjugated diene polymer cyclized product is a compound produced by introducing a polar group into the conjugated diene polymer cyclized product by a modifying reaction using a polar-group-containing compound.
7. The laminate in which the polar group is at least one group selected from the group consisting of an acid anhydride group, a carboxyl group, a hydroxyl group, an ester group, an epoxy group, and an amino group.
8. The laminate in which the ratio of the introduced polar group is from 0.1 to 200 millimoles per 100 g of the cyclized rubber.
9. The laminate in which the film thickness of the primer layer is from 0.1 to 200 μm.
10. The laminate in which the polymer which constitutes the polymer substrate is a hydrocarbon resin.
11. The laminate in which the film thickness of the thin film is from 1 nm to 100 μm.
12. The laminate in which the thin film is an amorphous carbon film.
13. A process for producing a laminate, comprising the steps of applying, to a surface of a polymer substrate, a primer comprising a cyclized rubber which is a conjugated diene polymer cyclized product or a derivative thereof to form a primer layer on the surface of the polymer substrate, and then laminating a thin film on the surface of the primer layer by a dry film-forming process.
14. A laminate comprising: a polymer substrate in which a cyclized rubber which is a conjugated diene polymer cyclized product or a derivative thereof is incorporated into a polymer-molding material; and a thin film laminated on the surface of the polymer substrate by a dry film-forming process.
15. The laminate in which the weight-average molecular weight of the cyclized rubber is from 1,000 to 1,000,000.
16. The laminate in which the cyclization ratio of the cyclized rubber is 10% or more.
17. The laminate in which the amount of gel in the cyclized rubber is 10% or less by weight.
18. The laminate in which the derivative of the conjugated diene polymer cyclized product is a compound produced by introducing a polar group into the conjugated diene polymer cyclized product by a modifying reaction using a polar-group-containing compound.
19. The laminate in which the polar group is at least one group selected from the group consisting of an acid anhydride group, a carboxyl group, a hydroxyl group, an ester group, an epoxy group, and an amino group.
20. The laminate in which the ratio of the introduced polar group is from 0.1 to 200 millimoles per 100 g of the cyclized rubber.
21. The laminate in which the incorporated amount of the cyclized rubber is from 0.1 to 50 parts by weight for 100 parts by weight of the polymer-molding material.
22. The laminate in which the polymer which constitutes the polymer-molding material is a hydrocarbon resin.
23. The laminate in which the film thickness of the thin film is from 1 nm to 100 μm.
24. The laminate in which the thin film is an amorphous carbon film.
25. A process for producing a laminate, comprising the step of laminating a thin film, on a surface of a polymer substrate produced by incorporating a conjugated diene polymer cyclized product or a derivative thereof into a polymer-molding material, by a dry film-forming method.

According to the present invention, provided are a laminate which is good in adhesiveness between its substrate and its thin film laminated thereon by a dry film-forming method such as a chemical vapor growth method or a vacuum evaporation method even if the substrate is a polymer substrate made of a nonpolar polymer, and a process for producing the same. In particular, in the case of using as the thin film an amorphous carbon film, the adhesiveness thereof is remarkably improved even if the film thickness of the amorphous film is made large.

BEST MODES FOR CARRYING OUT THE INVENTION

The laminate and the process for producing the same of the present invention are separated into a first embodiment thereof and a second embodiment thereof, and each of them will be described hereinafter.

A. First Embodiment

The laminate of the first embodiment is characterized by comprising: a polymer substrate; a primer layer comprising a cyclized rubber which is a conjugated diene polymer cyclized product or a derivative thereof, the layer being formed on the surface of the polymer substrate; and a thin film laminated on the surface of the primer layer by a dry film-forming method.

The primer layer in the present embodiment comprises a cyclized rubber which is a conjugated diene polymer cyclized product or a derivative thereof. The content of the cyclized rubber in the primer layer is preferably 10% or more by weight, more preferably 30% or more by weight, in particular preferably 50% or more by weight. If this content is too low, the effect of improving the adhesiveness tends to be poor.

The cyclization ratio of the cyclized rubber used in the present embodiment is usually 10% or more, preferably from 40 to 95%, more preferably from 60 to 90%. When the cyclization ratio is within this range, the property for improving the adhesiveness of the thin film becomes good.

The cyclization ratio is the following value: at each of times before and after cyclization reaction of the conjugated diene polymer, the peak area of protons originating from the double bonds therein is measured by proton NMR analysis; the percentage of the double bonds remaining in the cyclized product is obtained by regarding the area before the cyclization reaction as 100; and a value represented by the calculation equation=(100−the percentage of the double bonds remaining in the cyclized product) is calculated.

The weight-average molecular weight (Mw) of the cyclized rubber is a value measured by gel permeation chromatography (GPC) (the value being a value in terms of standard polystyrene), and is usually from 1,000 to 1,000,000, preferably from 10,000 to 500,000, more preferably from 30,000 to 300,000. If the Mw of the cyclized rubber is too small, the adhesiveness of the thin film tends to lower. Conversely, if the Mw is too large, a primer layer having a uniform film thickness tends not to be easily formed.

The glass transition temperature (Tg) of the cyclized rubber is not particularly limited, and can be appropriately selected in accordance with the use purpose. The Tg is usually from −50 to 200° C., preferably from 0 to 100° C., more preferably from 20 to 90° C., in particular preferably from 30 to 70° C. If the Tg of the cyclized rubber is over these ranges, a problem about the handle-ability thereof may be caused.

The cyclization degree (n) of the cyclized rubber, that is, the linking of the rings is usually in the range of 1 to 3. The amount of gel in the cyclized rubber is usually 10% or less by weight, preferably 5% or less by weight. It is particularly preferred that the cyclized rubber is a cyclized rubber which does not substantially have any gel. If the gel amount is large, a problem may be caused in a coating step at the time of the formation of the primer, which will be described later.

The conjugated diene polymer cyclized product is a product obtained by (co)polymerizing a conjugated diene monomer, or a conjugated diene monomer and another monomer copolymerizable with the conjugated diene monomer to produce a conjugated diene polymer, and then cyclizing the polymer in the presence of an acid catalyst.

Examples of the conjugated diene monomer include 1,3-butadiene, isoprene, 2,3-dimethyl-1,3-butadiene, 2-phenyl-1,3-butadiene, 1,3-pentadiene, 2-methyl-1,3-pentadiene, 1,3-hexadiene, 4,5-diethyl-1,3-octadiene, and 3-butyl-1,3-octadiene. These monomers may be used alone or in combination of two or more thereof.

Examples of the monomer copolymerizable with the conjugated diene monomer include aromatic vinyl monomers such as styrene, o-methylstyrene, p-methylstyrene, m-methylstyrene, 2,4-dimethylstyrene, ethylstyrene, p-tert-butylstyrene, α-methylstyrene, α-methyl-p-methylstyrene, o-chlorostyrene, m-chlorostyrene, p-chlorostyrene, p-bromostyrene, 2-methyl-1,4-dichlorostyrene, 2,4-dibromostyrene, and vinylnaphthalene; linear olefin monomers such as ethylene, propylene and 1-butene; cyclic olefin monomers such as cyclopentene and 2-norbornene; non-conjugated diene monomers such as 1,5-hexadiene, 1,6-heptadiene, 1,7-octadiene, dicyclopentadiene, and 5-ethylidene-2-norbornene; (meth)acrylic acid esters such as methyl (meth) acrylate, and ethyl (meth)acrylate; (meth)acrylonitrile; and (meth)acrylamide. These may be used alone or in combination of two or more thereof.

The content of the conjugated diene monomer units in the conjugated diene polymer is appropriately selected as long as the advantageous effects of the present embodiment are not damaged, and is usually 40% or more by mole, preferably 60% or more by mole, more preferably 80% or more by mole. If this content is small, the cyclization ratio is not easily made high. Thus, the expected effect of improving the physical properties tends not to be easily obtained.

It is advisable that the polymerizing method for the conjugated diene polymer is in accordance with a usual method. For example, the polymerization is conducted by solution polymerization or emulsion polymerization using a catalyst known in the prior art, such as a Ziegler polymerization catalyst containing titanium or the like as a catalyst component, an alkyllithium polymerization catalyst, or a radical polymerization catalyst.

Specific examples of the conjugated diene polymer include natural rubber (NR), styrene-butadiene rubber (SBR), polyisoprene rubber (IR), polybutadiene rubber (BR), isoprene-isobutylene copolymerized rubber (IIR), ethylene-propylene-diene copolymerized rubber, and butadiene-isoprene copolymerized rubber (BIR). Of these, polyisoprene rubber (IR) and polybutadiene rubber (BR) are preferred.

Usually, the cyclization of the conjugated diene polymer is conducted by dissolving the conjugated diene polymer into a hydrocarbon solvent and then causing the polymer to react in the presence of an acid catalyst.

The acid catalyst may be an acid catalyst that is ordinarily used for cyclization reaction, and examples thereof include sulfuric acid; organic sulfonic acid compounds, such as organic sulfonic acids such as fluoromethanesulfonic acid, difluoromethanesulfonic acid, p-toluenesulfonic acid, xylenesulfonic acid and alkylbenzenesulfonic acid having an alkyl group having 2 to 16 carbon atoms, anhydrides thereof, and alkyl esters thereof; and metal halides such as trifluoroboron, trichloroboron, tetrachlorotin, tetrachlorotitanium, aluminum chloride, diethylaluminum monochloride, ethylammonium chloride, aluminum bromide, antimony pentachloride, tungsten hexachloride, and iron chloride. These acid catalysts may be used alone or in combination of two or more thereof. Of these, organic sulfonic acid compounds are preferred, and p-toluenesulfonic acid is more preferred.

The used amount of the acid catalyst is usually from 0.05 to 10 parts by weight, preferably from 0.1 to 5 parts by weight, more preferably from 0.3 to 2 parts by weight for 100 parts by weight of the conjugated diene polymer.

The hydrocarbon solvent used in the reaction is not limited to any especial kind if the solvent does not hinder the cyclization reaction. Examples thereof include aromatic hydrocarbons such as benzene, toluene, xylene, and ethylbenzene; aliphatic hydrocarbons such as n-pentane, n-hexane, n-heptane, and n-octane; and alicyclic hydrocarbons such as cyclopentane and cyclohexane. Of these, solvents having a boiling point of 70° C. or higher are preferred. The solvent used in the polymerization reaction for the conjugated diene polymer can be used as it is. In this case, the acid catalyst is added to the polymerization reaction solution in which the polymerization has been ended.

The used amount of the solvent is in such a range that the concentration of solid contents of the conjugated diene polymer is usually from 5 to 60% by weight, preferably from 20 to 40% by weight.

The cyclization reaction can be conducted under any one of applied pressure, reduced pressure, and atmospheric pressure. The reaction is desirably conducted under atmospheric pressure from the viewpoint of easiness of operation therefor. When the reaction is conducted in dry gas flow, in particular in the atmosphere of dry nitrogen or dry argon, side reactions originating from water content can be restrained.

It is advisable to decide the reaction temperature or the reaction time in accordance with a usual method. The reaction temperature is usually from 50 to 150° C., preferably from 80 to 110° C., and the reaction time is usually from 0.5 to 10 hours, preferably from 2 to 5 hours.

Usually, the thus-obtained conjugated diene polymer cyclized product is obtained as a solid by inactivating the cyclizing catalyst, removing the residue of the cyclizing catalyst and removing the inactive solvent in a usual way.

It is possible to use, as the derivative of the conjugated diene polymer cyclized product, a compound produced by introducing a polar group into the conjugated diene polymer cyclized product by a modifying reaction using a polar-group-containing compound.

The polar-group-containing compound, which is used in the modifying reaction, is not limited to any especial kind if the compound is a compound capable of introducing a polar group into the conjugated diene polymer cyclized product.

Examples thereof include ethylenic unsaturated compounds having a polar group such as an acid anhydride, carboxyl, hydroxyl, thiol, ester, epoxy, amino, amide, cyano or silyl group, or a halogen.

The polar group is preferably an acid anhydride, carboxyl, hydroxyl, ester, epoxy or amino group, and is more preferably an acid anhydride, carboxyl or hydroxyl group since the group is good in effect of improving the adhesiveness of the thin film.

Examples of the compound having an acid anhydride or carboxyl group include maleic anhydride, itaconic anhydride, aconitic anhydride, norbornenedicarboxylic anhydride, acrylic acid, methacrylic acid, and maleic acid. Of these, maleic anhydride is preferably used from the viewpoint of reactivity and economy.

Examples of the compound containing a hydroxyl group include hydroxyalkyl esters of an unsaturated acid, such as 2-hydroxyethyl (meth)acrylate and 2-hydroxypropyl (meth) acrylate; unsaturated acid amides having a hydroxyl group, such as N-methylol(meth)acrylamide, and N-(2-hydroxyethyl)(meth)acrylamide; polyalkylene glycol monoesters of an unsaturated acid, such as polyethylene glycol mono(meth) acrylate, polypropylene glycol mono(meth)acrylate, and poly(ethylene glycol-propylene glycol) mono(meth)acrylate; and polyhydric alcohol monoesters of an unsaturated acid such as glycerol mono(meth)acrylate. Of these, hydroxyalkyl esters of an unsaturated acid are preferred, and 2-hydroxyethyl acrylate and 2-hydroxyethyl methacrylate are more preferred.

Examples of the ethylenic unsaturated compound having some other polar group include methyl (meth)acrylate, ethyl (meth)acrylate, butyl (meth)acrylate, glycidyl (meth)acrylate, dimethylaminoethyl (meth)acrylate, dimethylaminopropyl (meth)acrylate, (meth)acrylamide, and (meth)acrylonitrile.

The method for introducing the polar-group-containing compound into the conjugated diene polymer cyclized product is not particularly limited. In the case of adding an ethylenic unsaturated compound thereto, it is in general advisable to conduct the introduction in accordance with a known reaction called ene-addition reaction or graft polymerization reaction.

This addition reaction is conducted by causing the conjugated diene polymer cyclized product to react with the polar-group-containing compound optionally in the presence of a radical generator. Examples of the radical generator include peroxides such as di-tert-butylperoxide, dicumylperoxide, benzoylperoxide, tert-butylperoxide benzoate, methyl ethyl ketone peroxide; and azonitriles such as azobisisobutyronitrile and dimethyl 2,2'-azobis(2-methylpropionate).

The addition reaction may be conducted in a solid phase state or in a solution state. The reaction is preferably conducted in a solution state since the reaction is easily controlled. Examples of the used solvent are the same as the above-mentioned hydrocarbon solvents in the cyclization reaction.

The used amount of the polar-group-containing compound is appropriately selected, and is in such a range that the rate of the introduced polar group is usually from 0.1 to 200 millimoles, preferably from 1 to 100 millimoles, more preferably from 5 to 50 millimoles per 100 g of the modified cyclized rubber.

The reaction for introducing the polar group can be conducted under any one of applied pressure, reduced pressure, and atmospheric pressure. The reaction is desirably conducted under atmospheric pressure from the viewpoint of easiness of operation therefor. When the reaction is conducted in dry gas flow, in particular in the atmosphere of dry nitrogen or dry argon, side reactions originating from water content can be restrained.

It is advisable to decide the reaction temperature or the reaction time in accordance with a usual method. The reaction temperature is usually from 30 to 250° C., preferably from 60 to 200° C., and the reaction time is usually from 0.5 to 5 hours, preferably from 1 to 3 hours.

If necessary, the cyclized rubber may further contain additives such as a filler, an antistatic agent, an age resistor, a lubricant, a crosslinking agent, an anti-blocking agent, a colorant, a light ray blocking agent, and an ultraviolet absorbent.

The primer layer comprises the above-mentioned cyclized rubber as an essential component. Dependently on the kind of the polymer substrate or the kind of the thin film, the layer may contain additives such as other polymers such as acrylic resin, urethane resin, epoxy resin, melamine resin, alkyd resin, chlorinated olefin resin, silicone rubber, and acrylic rubber; and additives such as a pigment, a dye, a filler, an age resistor, an ultraviolet absorbent, an antifoamer, a thickener, a dispersing agent, and a surfactant.

The film thickness of the primer layer in the present embodiment is not particularly limited, and is usually from 0.1 to 200 μm, preferably from 0.5 to 100 μm, more preferably from 1 to 100 μm, in particular preferably from 1 to 50 μm, most preferably from 5 to 50 μm.

Examples of the polymer which constitutes the polymer substrate in the present embodiment include thermoplastic resin, curing resin, and elastomer.

Examples of the thermoplastic resin include hydrocarbon resin, polyester resin, polyamide resin, polyimide resin, polyetherimide resin, polysulfone resin, polyethersulfone resin, polyetheretherketone resin, polycarbonate resin, polyvinyl butyrate resin, and polyarylate resin.

Examples of the curing resin include acrylic resin, phenol resin, cresol resin, urea resin, melamine resin, alkyd resin, furan resin, unsaturated polyester resin, epoxy resin, and urethane resin.

In connection with the manner of the curing, for example, the following materials can be listed up: a material cured by irradiation with active radiating rays such as ultraviolet rays or an electron beam; a material cured by polymerizing a monomer with applied heat in the presence of a catalyst; and a material cured by mixing two liquids and then heating the liquids.

Examples of the elastomer include vulcanized rubbers such as natural rubber, polybutadiene rubber, styrene-butadiene rubber, and acrylonitrile-butadiene rubber; olefin thermoplastic elastomers, styrene thermoplastic elastomers, polyester thermoplastic elastomers, and polyamide thermoplastic elastomers.

The polymer substrate made of any non-polar polymer out of the above-mentioned polymers causes the adhesiveness thereof to the thin film to be remarkably improved. Examples of such a non-polar polymer include hydrocarbon resins. Of these, linear olefin resin and cyclic olefin resin are preferred.

Specific examples of the linear olefin resin include homopolymers and copolymers made from an α-olefin having 2 to 4 carbon atoms, such as ethylene, propylene or butene. Of these, polyethylene and polypropylene resins are preferred and polypropylene resin is more preferred from the viewpoint of multiusability.

The polypropylene resin is not limited to any especial kind if the resin is a polymer or copolymer obtained by polymerizing monomers made mainly of propylene. Examples thereof include a homopolymer from propylene, propylene-ethylene random copolymer, propylene-α-olefin random copolymer, and propylene-ethylene-α-olefin ternary polymers.

An example of the cyclic olefin resin is norbornene-based resin described in JP-A No. 7-231928. Such a norbornene-based resin is a resin obtained by polymerizing materials containing at least a norbornene-based monomer. Examples thereof include (i) a ring-opened (co)polymer of a norbornene-based monomer, and polymers subjected to polymer-modification such as addition of maleic acid or addition of cyclopentadiene as the need arises; (ii) resin in which the (i) is hydrogenated; (iii) resin obtained by addition-polymerizing a norbornene-based monomer; and (iv) resin obtained by addition-copolymerizing a norbornene-based monomer with an olefin monomer such as ethylene or an α-olefin. The method for the polymerization and the method for the hydrogenation can be conducted in a usual way.

Examples of the norbornene-based monomer include norbornene and alkyl- and/or alkylidene-substituted products such as 5-methyl-2-norbornene, 5-dimethyl-2-norbornene, 5-ethyl-2-norbornene, 5-butyl-2-norbornene and 5-ethylidene-2-norbornene, and polar-group-substituted products thereof, which are substituted with a polar group such as a halogen; dicyclopentadiene and 2,3-dihydrodicyclopentadiene; dimethanooctahydronaphthalene, alkyl- and/or alkylidene-substituted products thereof, and polar-group-substituted products thereof, which are substituted with a polar group such as a halogen, for example, 6-methyl-1,4:5,8-dimethano-1,4,4a,5,6,7,8,8a-octahydronaphthalene, 6-ethyl-1,4:5,8-dimethano-1,4,4a,5,6,7,8,8a-octahydronaphthalene, 6-ethylidene-1,4:5,8-dimethano-1,4,4a,5,6,7,8,8a-octahydronaphthalene, 6-chloro-1,4:5,8-dimethano-1,4,4a,5,6,7,8,8a-octahydronaphthalene, 6-cyano-1,4:5,8-dimethano-1,4,4a,5,6,7,8,8a-octahydronaphthalene, 6-pyridyl-1,4:5,8-dimethano-1,4,4a,5,6,7,8,8a-octahydronaphthalene, and 6-methoxycarbonyl-1,4:5,8-dimethano-1,4,4a,5,6,7,8,8a-octahydronaphthalene; an adduct of cyclopentadiene and tetrahydroindene or the like; trimers or tetramers of cyclopentadinene, for example, 4,9:5,8-dimethano-3a,4,4a,5,8,8a,9,9a-octahydro-1H-benzoindene, and 4,11:5,10:6,9-trimethano-3a,4,4a,5,5a,6,9,9a,10,10a,11,11a-dodecahydro-1H-cyclopentaanthracene.

The norbornene-based resin which can be used in the present embodiment is preferably a resin in which the weight-average molecular weight, which is measured by gel permeation chromatography (GPC) using a toluene or cyclohexane solvent, is usually from 1,000 to 1,000,000, preferably from 10,000 to 500,000, more preferably from 20,000 to 100,000. If the weight-average molecular weight is too small, the physical strength of the polymer substrate may be poor. Conversely, if it is too large, the resin may not be molded with ease.

When the norbornene-based resin is a resin obtained by hydrogenating a ring-opened polymer made from a norbornene-based monomer, the hydrogenation ratio thereof is preferably 90% or more, more preferably 95% or more, in particular preferably 99% or more from the viewpoint of resistance against thermal deterioration, resistance against optical deterioration and others.

The polymer may be used alone or in combination of two or more thereof.

If necessary, the polymer substrate may contain, besides the above-mentioned polymer, additives such as a filler, an antistatic agent, an age resistor, a lubricant, a crosslinking agent, an anti-blocking agent, a colorant, a light ray blocking agent, and an ultraviolet absorbent.

The shape of the polymer substrate is not particularly limited, and examples thereof are various shapes dependently on a final product, such as spherical, rodlike, columnar, plate, sheet, and film forms.

The polymer substrate is usually molded by a molding method known in the prior art, and then used. Examples of the molding method include extrusion molding, cast molding, calendar molding, vacuum molding, injection molding, inflation molding, and blow molding.

Examples of the molded product of the polymer substrate include a film molded product, an injection molded product, an extrusion molded product, a vacuum molded product, and a blow molded product. Of these, a film molded product and an injection molded product can be preferably used.

The film molded product may be, for example, a non-oriented film molded by extrusion molding or cast molding, or may be a oriented film produced by drawing this non-oriented film by a drawing method such as monoaxial drawing, tenter-system sequential biaxial drawing, tenter-system simultaneous biaxial drawing, or tubular system simultaneous biaxial drawing. Of these, an oriented film can be preferably used.

The thickness of the film is appropriately selected in the accordance with the use purpose thereof, and is usually from 1 to 1,000 μm, preferably from 5 to 500 μm, more preferably from 10 to 200 μm.

The width or the length of the film is not particularly limited, and is appropriately selected in the accordance with the use purpose.

The thin film in the present embodiment is a film laminated on the surface of the primer layer by a dry film-forming method.

In the embodiment, the dry film-forming method is usually a method of converting a metal, a metal oxide, an organic material or the like into gas, and then forming the film on a surface of a substrate. This method is classified into a physical film-forming method and a chemical film-forming method.

Examples of the physical film-forming method include vacuum vapor-deposition, sputtering, ion plating, ion implantation, ion beam sputtering and plasma ion implantation.

Examples of the chemical film-forming method include chemical vapor depositions (CVDs) such as thermal CVD, optical CVD, plasma enhanced CVDs (such as microwave CVD and high frequency CVD).

Examples of the material of the thin film include metals such as aluminum, zinc, nickel, zirconium, gold, copper, tin, indium, titanium and chromium; metal oxides such as silicon oxide, aluminum oxide, magnesium oxide, and zirconium oxide; metal nitrides such as SiN, CrN, TiN and TiAlN; and materials a typical composition of which is $C_xH_y$ (which may be an amorphous carbon film). Of these materials, an amorphous carbon film causes the adhesiveness thereof to the thin film to be remarkably improved.

The amorphous carbon film is described herein. The amorphous carbon film is an amorphous carbon film which does not clearly exhibit any crystal structure by X-ray analysis thereof, or a hydrogenated carbon film in which hydrogen is bonded to nonbonding hands of carbon.

The amorphous carbon film may be formed in accordance with a usual method. For example, methods disclosed in the following can be used: JP-A Nos. 5-221691, 11-70152, 11-92935, 11-102518, 11-246975, 2000-117881, 2000-272156, 2001-180700, 2001-232714, 2001-240115, 2001-310412 and 2001-316489, and others.

Specific examples of the formation method include physical film-forming methods such as ion plating, sputtering, ion beam sputtering, and plasma ion implantation; and chemical film-forming methods such as plasma enhanced CVD, microwave CVD, and high frequency CVD. These methods are each a method for generating plasma in a film-forming apparatus to ionize or excite raw gas. Examples of the method include a method of applying, for example, DC voltage to raw gas so as to plasma-decompose the gas, a method of applying a high frequency wave to raw gas so as to plasma-decompose the gas, a method of plasma-decomposing raw gas by microwave discharge, and a method of decomposing raw gas thermally by heating based on electron cyclotron resonance. Of these, the microwave plasma method and the electron cyclotron resonance method are preferred when the rate and the temperature for film-formation are desired to be made large and low, respectively. In the case of forming a film on a surface of a substrate having a large area, the high-frequency plasma method is preferred.

As the raw gas for the amorphous carbon film, a gas containing carbon and hydrogen atoms is usually used. Examples thereof include alkane gases such as methane, ethane, propane, butane, pentane, and hexane; alkene gases such as ethylene, propylene, butene, and pentene; alkadiene gases such as pentadiene and butadiene; alkyne gases such as acetylene and methylacetylene; aromatic hydrocarbon gases such as benzene, toluene, xylene, indene, naphthalene, and phenanthrene; cycloalkane gases such as cyclopropane, cyclopentane and cyclohexane; alcohol gases such as methanol and ethanol; ketone gases such as acetone and methyl ethyl ketone; aldehyde gases such as methanal and ethanal. These raw gases may be used alone or in combination of two or more thereof.

Other examples of the raw gas include mixed gases of the above-mentioned gas containing carbon and hydrogen atoms and a rare gas; mixed gases of a gas made only of carbon and oxygen atoms, such as carbon monoxide gas and carbon dioxide gas, and the above-mentioned gas; mixed gases of a gas made only of carbon and oxygen atoms, such as carbon monoxide gas and carbon dioxide gas, and hydrogen gas; and mixed gases of a gas made only of carbon and oxygen atoms, such as carbon monoxide gas and carbon dioxide gas, and oxygen gas or water vapor.

The mixed amounts of the hydrogen gas, oxygen gas (oxygen-containing gas) and rare gas in these mixed gases are appropriately selected in accordance with the kind of the used film-forming device, the kind of the mixed gas, pressure for the film formation, and others. The selection of these conditions makes it possible to adjust the hydrogen atom concentration or oxygen atom concentration in the formed amorphous carbon film into desired values.

Examples of the carbon source used when the amorphous carbon film is formed by ion beam sputtering include solids of carbon allotropes such as graphite and diamond. These are set inside plasma under the atmosphere of hydrogen gas or a rare gas, and used.

The amorphous carbon film formed on the surface of the substrate by the above-mentioned method can be checked by Raman spectroscopy. The hydrogen and oxygen atom concentrations in the amorphous carbon film can be checked by SIMS (secondary ion mass spectroscopy).

The film thickness of the thin film is not particularly limited, and is usually from 1 nm to 100 µm, preferably from 10 nm to 10 µm.

When the thin film is an amorphous carbon film, the film thickness thereof is appropriately selected in accordance with the use purpose. If the film thickness is too large, the thin film may be peeled or deformed by internal stress of the film. Thus, the film thickness is usually 100 µm or less, preferably 50 µm or less, more preferably 10 µm or less, most preferably 5 µm or less. If the film thickness is too small, the function of the thin film lowers. Thus, the film thickness is usually 0.0001 µm or more, preferably 0.001 µm or more, more preferably 0.01 µm or more, most preferably 0.05 µm or more.

The selection of the material of the thin film makes it possible to yield a laminate having the following functions: for example, colorability, masking property, lubricity, antiblocking property, antistatic property, gas barrier property, water vapor barrier property, water resistance, hydrophilicity, abrasion resistance, defogging property, easy-writable property, and lusterless property.

The thin film may be formed on the whole surface of the polymer substrate, may be partially formed, or may be formed into a specific pattern.

The laminate of the present embodiment may be a product produced by forming, on the surface of the above-mentioned thin film, a mono-layered or multi-layered film made of materials different from the material of the thin film by a dry film-forming method.

A process for producing a laminate according to the present embodiment is characterized by applying, to a surface of a polymer substrate, a primer comprising a cyclized rubber which is a conjugated diene polymer cyclized product or a derivative thereof to form a primer layer on the surface of the polymer substrate, and then laminating a thin film on the surface of the primer layer by a dry film-forming process.

In the present embodiment, a primer comprising the above-mentioned cyclized rubber is firstly applied to a surface of a polymer substrate.

The primer is usually a solution or dispersion in which the above-mentioned cyclized rubber and additives blended if necessary are dissolved or dispersed in a solvent. The solvent used at this time is not limited to any especial kind, and examples thereof include aliphatic hydrocarbon solvents such as pentane, hexane, and heptane; alicyclic hydrocarbon solvents such as cyclopentane, cyclohexane, and methylcyclohexane; aromatic hydrocarbon solvents such as benzene, toluene and xylene; ketone solvents such as methyl ethyl ketone, and methyl isobutyl ketone; ester solvents such as ethyl acetate and propyl acetate; alcohol solvents such as ethanol, propyl alcohol, and butyl alcohol; ether solvents such as diethyl ether, and dibutyl ether; halogenated solvents such as chloroform and dichloroethane; and water. Of these, aliphatic hydrocarbon solvents, alicyclic hydrocarbon solvents, aromatic hydrocarbon solvents, ester solvents and ketone solvents can be preferably used from the viewpoint of solubility, volatility and others.

The solid concentration in the primer is not particularly limited, and is usually from 0.1 to 50% by weight, preferably from 0.5 to 40% by weight, more preferably from 1 to 30% by weight. The viscosity of the primer is largely varied by the method for the application thereof, and is usually in the range of 0.01 to 100 dPa·s.

The method for the application of the primer is not particularly limited, and may be a method known in the prior art. Examples of the application method include various printing methods such as gravure printing, letterpress printing, offset printing, gravure offset printing, screen printing, flexography, dry offset printing, ink-jet printing and electrostatic printing; and spin coating, roll coating, comma coating, gravure coating, microgravure coating, flow coating, knife coating, air knife coating, rod coating, kiss coating, lip coating, die coating, spray coating, and dip coating.

After the application of the primer, the solvent therein is usually vaporized by heating or the like. When the primer is a solution or dispersion curable by active radial rays such as ultraviolet rays and an electron beam, the primer can be cured by the irradiation thereof with the radial rays.

After the primer layer is formed on the surface of the primer substrate as described above, a thin film is laminated on the surface of the primer layer by a dry film-forming method.

It is advisable that conditions for the dry film-forming method are appropriately selected in accordance with the kind of the adopted dry film-forming method, the material of the thin film, and the film thickness of the thin film.

B. Second Embodiment

The laminate of the second embodiment is a laminate comprising: a polymer substrate in which a cyclized rubber which is a conjugated diene polymer cyclized product or a derivative thereof is incorporated into a polymer-molding material; and a thin film laminated on the surface of the polymer substrate by a dry film-forming process.

The cyclized rubber used in the present embodiment may be the same as described in the first embodiment.

The polymer substrate used in the present embodiment is a substrate in which the above-mentioned cyclized rubber is incorporated into a polymer-molding material. The incorporated amount of the cyclized rubber is usually from 0.1 to 50 parts by weight, preferably from 0.5 to 20 parts by weight, more preferably from 1 to 10 parts by weight for 100 parts by weight of the polymer-molding material. If the incorporated amount is too small, the adhesiveness of the thin film thereto tends to be poor. Conversely, if the amount is too large, mechanical strength of the polymer substrate may lower.

The polymer which constitutes the polymer-molding material may be the same as described in the item of the polymer substrate in the first embodiment.

If necessary, the polymer-molding material may further contain additives such as a filler, an antistatic agent, an age resistor, a lubricant, a crosslinking agent, an anti-blocking agent, a colorant, a light ray blocking agent, and an ultraviolet absorbent.

The method for incorporating the cyclized rubber into the polymer-molding material is not particularly limited. Usually, a method of melting and kneading the components is adopted.

The shape, the molding method, the molded product, and thickness and others of the polymer substrate are the same as described about the first embodiment. Thus, any description thereof is not repeated herein.

The thin film in the present embodiment is a film laminated on the surface of the polymer substrate by a dry film-forming method, and may be the same as described about the first embodiment.

The selection of the material of the thin film makes it possible to yield a laminate having various functions as described about the first embodiment. In the same manner as in the first embodiment, the thin film may be formed on the whole surface of the polymer substrate, may be partially formed, or may be formed into a specific pattern.

The laminate of the present embodiment may be a product produced by forming, on the surface of the above-mentioned thin film, a mono-layered or multi-layered film made of materials different from the material of the thin film by a dry film-forming method.

The process for producing a laminate according to the present embodiment is characterized by laminating a thin film, on a surface of a polymer substrate produced by incorporating a conjugated diene polymer cyclized product or a derivative thereof into a polymer-molding material, by a dry film-forming method.

It is advisable that conditions for the dry film-forming method are appropriately selected in accordance with the kind of the adopted dry film-forming method, the material of the thin film, and the film thickness of the thin film.

The laminate of the present invention can be used for various purposes, and can be preferably used as, for example, automobile exterior members such as a bumper, a corner bumper, a bumper air-dam skirt, a mud guard, a side braid, a wheel cap, a spoiler, a side step, and a door mirror base; automobile interior members such as an instrument panel, a lever, a knob, a dashboard, and a door liner; electrical equipment parts such as a connector, a cap plug, a pot, a refrigerator, lighting equipment, audio equipment, and OA equipment; daily necessaries such as a color box and a storage case; and gas barrier wrapping films such as food wrappings for cup noodles, confectionery, vegetables, and so on, and textile wrappings for shirts, T-shirts, panty hose, and so on. The film vapor-deposited with a metal can be in particular preferably used for wrappings for foods, such as potato chips, for which moisture-proofing and oxygen barrier property are necessary.

The present invention is not limited to the above-mentioned embodiments. The embodiments are mere examples, and any modification having substantially the same structure as the technical concept recited in the claims of the present invention and producing the same effect and advantages as the concept is included in the technical scope of the present invention.

EXAMPLES

The present invention will be more specifically described by the following examples. The word "part(s)" and the symbol "%" in the following description are those based on weight unless otherwise specified.

Analysis and evaluation were made as follows:

(1) Weight-Average Molecular Weight (Mw) of Each Polymer

The weight-average molecular weight (Mw) was obtained as a value in terms of standard polystyrene by gel permeation chromatography (GPC).

(2) Cyclization Ratio of Each Cyclized Rubber

The cyclization ratio was obtained by $^1$H-NMR analysis in accordance with a method described in the following documents (i) and (ii).

(i) M. a. Golub and J. Heller. Can. J. Chem, 41, 937 (1963), and (ii) Y. Tanaka and H. Sato, J. Polym. Sci: Poly. Chem. Ed., 17, 3027 (1979).

(3) Amount of Polar Groups in Each Modified Cyclized Rubber

A cyclized rubber modified with maleic anhydride has an acid anhydride group originating from the added maleic acid and a carboxyl group obtained by the hydrolysis of the acid anhydride group. The Fourier transform infrared spectrum of this cyclized rubber was measured, and the strength of the peak (1760 to 1780 $cm^{-1}$) of the acid anhydride group was measured, and then the content of the acid anhydride group was obtained by a calibration curve method. In the same way, the strength of the peak (1700 $cm^{-1}$) of the carboxyl group was measured, and then the content of the carboxyl group was obtained by a calibration curve method.

The hydroxyl value of each cyclized rubber modified with a hydroxyl-containing compound was measured according to a method described in "Standard Oil and Fat Analysis Test method (Japan Oil Chemists' Society)" 2, 4, 9, 2-83. From this hydroxyl value, the amount of hydroxyl in the modified cyclized rubber was calculated.

(4) Adhesiveness (Observation with a Transmission Electron Microscope)

A cross section of each obtained laminate film was observed with a transmission electron microscope, and the adhesiveness of its silicon oxide film was judged on the following criterion. The results are shown in Table 1.

◯: The silicon oxide was not peeled over the whole of the observed cross section.

x: The silicon oxide was peeled over the whole of the observed cross section.

(5) Check Pattern Test

Each vapor-deposited film was cut lengthwise and widthwise from the upper thereof at intervals of 1 mm with a cutter, so as to have 11 cuts plus 11 cuts, the former cuts being perpendicular to the latter cuts. In this way, 100 squares having sides 1 mm in length were made. A commercially available cellophane adhesive tape (manufactured by Sekisui Chemical Co., Ltd.) was stuck thereon, and then the adhesive tape was pulled and peeled in the direction perpendicular to the surface of the vapor-deposited film. The number of squares that were not peeled out of the 100 squares is shown.

Synthesis Example 1

Into a pressure resistant reactor equipped with a stirrer, a thermometer, a reflux condenser and a nitrogen gas introducing tube were charged 300 parts of polyisoprene (cis-1,4 units: 73%, trans-1,4 units: 22%, 3,4-units: 5%, weight-average molecular weight: 174,000) cut into pieces 10 mm cubic together with 700 parts of toluene (polymer concentration: 30%). The reactor was purged with nitrogen, and then heated to 80° C. While the solution was stirred, the polyisoprene was completely dissolved into toluene. Thereafter, 2.07 parts of p-toluenesulfonic acid (anhydrous) was charged into the solution to conduct cyclization reaction at 80° C. After about 4 hours, a 25% solution of sodium carbonate in water, containing 0.8 part of sodium carbonate, was charged into the solution to quench the reaction. The solution was stirred at 80° C. for 30 minutes. Thereafter, 2 parts of a filtration aid (Radio Light) was added thereto, and a filter (GA-100, manufactured by Advantec Toyo Kaisha, Ltd.), made of glass fiber and having pores of 1 μm diameter, was used to remove the residue of the catalyst.

To this solution was added 0.3 part of an age resistor (Irganox 1010, manufactured by Chiba Specialty Chemicals), and then toluene was removed at 160° C. When the concentration of solid contents in the solution turned into 70 to 75% by weight, the solution was poured into a metal vat coated with a fluorine-contained resin, and then dried under a reduced pressure at 75° C. so as to yield a cyclized rubber A. The resultant cyclized rubber A was analyzed. The results are shown in Table 1.

Synthesis Example 2

A cyclized rubber B was yielded in the same way as in Synthesis Example 1 except that polyisoprene containing 68% of cis-1,4 units, 25% of trans-1,4 units and 7% of 3,4-units and having a weight-average molecular weight of 92,100 was used as polyisoprene, the used amount of p-toluenesulfonic acid (subjected to reflux and dehydration so as to set the amount of water content to 150 ppm or less in toluene) was changed to 2.81 parts, and the reaction was quenched by charging a 25% solution of sodium carbonate in water, containing 1.08 parts of sodium carbonate. The resultant cyclized rubber B was analyzed. The results are shown in Table 1.

Synthesis Example 3

Into a pressure resistant reactor equipped with a stirrer, a thermometer, a reflux condenser and a nitrogen gas introducing tube were charged 300 parts of polyisoprene (cis-1,4 units: 70%, trans-1,4 units: 24%, 3,4-units: 6%, weight-average molecular weight: 141,000) cut into pieces 10 mm cubic together with 700 parts of toluene (polymer concentration: 30%). The reactor was purged with nitrogen, and then heated to 80° C. While the solution was stirred, the polyisoprene was completely dissolved into toluene. Thereafter, 2.69 parts of p-toluenesulfonic acid (anhydrous) were charged into the solution to conduct cyclization reaction at 80° C. After about 4 hours, a 25% solution of sodium carbonate in water, containing 1.03 parts of sodium carbonate, was charged into the solution to quench the reaction. The solution was stirred at 80° C. for 30 minutes. Thereafter, 2 parts of a filtration aid (Radio Light) were added thereto, and a filter (GA-100, manufactured by Advantec Toyo Kaisha, Ltd.), made of glass fiber and having pores of 1 μm diameter, was used to remove the residue of the catalyst.

To this solution was added 0.3 part of an age resistor (Irganox 1010, manufactured by Chiba Specialty Chemicals), and then toluene was removed at 160° C. When the concentration of solid contents in the solution turned into 70 to 75% by weight, 9 parts of maleic anhydride were charged into the solution to conduct reaction at 180° C. for 1 hour. After the reaction, unreacted maleic anhydride and toluene were removed while nitrogen was caused to flow at 180° C. Thereafter, the resultant was dried under a reduced pressure at 75° C. so as to yield a modified cyclized rubber C. The resultant modified cyclized rubber C was analyzed. The results are shown in Table 1.

Synthesis Example 4

Into a pressure resistant reactor equipped with a stirrer, a thermometer, a reflux condenser and a nitrogen gas introducing tube were charged 300 parts of polyisoprene (cis-1,4 units: 68%, trans-1,4 units: 25%, 3,4-units: 7%, weight-average molecular weight: 92,100) cut into pieces 10 mm cubic together with 700 parts of toluene (polymer concentration: 30%). The reactor was purged with nitrogen, and then heated to 80° C. While the solution was stirred, the polyisoprene was completely dissolved into toluene. Thereafter, 2.07 parts of p-toluenesulfonic acid (anhydrous) were charged into the solution to conduct cyclization reaction at 80° C. After about 4 hours, a 25% solution of sodium carbonate in water, containing 0.8 part of sodium carbonate, was charged into the solution to quench the reaction. The solution was stirred at 80° C. for 30 minutes. Thereafter, 2 parts of a filtration aid (Radio Light) were added thereto, and a filter (GA-100, manufactured by Advantec Toyo Kaisha, Ltd.), made of glass fiber and having pores of 1 μm diameter, was used to remove the residue of the catalyst.

To this solution was added 0.3 part of an age resistor (Irganox 1010, manufactured by Chiba Specialty Chemicals), and then toluene was removed at 160° C. When the concentration of solid contents in the solution turned into 50 to 60% by weight, 15 parts of hydroxyethyl acrylate and 1.5 parts of an azo type initiator, ACHN (1,1-azobis-1-cyclohexanecarbonitrile), were charged into the solution to conduct reaction at 140° C. for 1 hour. After the reaction, unreacted hydroxyethyl acrylate and toluene were removed while nitrogen was caused to flow at 140° C. Thereafter, the solution was poured into a metal vat coated with a fluorine-contained resin, and then dried under a reduced pressure at 75° C. so as to yield a modified cyclized rubber D. This cyclized rubber D was analyzed. The results are shown in Table 1.

A. Laminates of the First Embodiment

Examples 1 to 4

The cyclized rubbers A to D were each dissolved into a mixed solution in which toluene/methyl ethyl ketone=8/2 (ratio by weight), so as to give a concentration of 20%, thereby preparing primers.

One hundred parts of polypropylene (F-200S, manufactured by Idemitsu Kosan Co., Ltd.) were mixed with 0.01 part of Irganox 1010 (manufactured by Chiba Specialty Chemicals) in a Henschel mixer, and then a biaxial extruder was used to melt and knead the mixture to yield pellets. A monoaxial extruder was used to extrude the pellets from a multi-manifold shaped T die at a resin temperature of 250° C. and a cooling roll temperature of 30° C., thereby yielding a sheet of 1000 μm thickness. This sheet was drawn 5 times in the lengthwise direction with a drawing roll heated to 125° C., and next the sheet was drawn 10 times in the lateral direction in a tenter in which hot wind of 155° C. temperature was circulated. Furthermore, the sheet was thermally set at 70° C. for 2 seconds to yield a biaxial-oriented film. The thickness of the film was 25 μm.

Each of the above-mentioned primers was applied onto a single face of this biaxial-oriented film so as to give a film thickness of 10 to 20 μm, and then dried at 80° C.

A winding type vacuum evaporation device was used, SiO (manufactured by SUMITOMO TITANIUM CORPORATION) was used as a vapor-deposited material, and this was vaporized onto the primer-applied face of the resultant film in a high-frequency heating manner. Under a condition that the pressure was $8 \times 10^{-5}$ Torr, a silicon oxide film of 25 nm thickness was laminated onto the face.

The adhesiveness of the silicon oxide film in the resultant laminate film was evaluated by observation with a transmission electron microscope. The result is shown in Table 1.

Comparative Example 1

No primer was used to yield a laminate film having a laminated silicon oxide film in the same way as in Example 1. The adhesiveness of the silicon oxide film in this laminate film was evaluated by observation with a transmission electron microscope. The result is shown in Table 1.

TABLE 1

| | Example | | | | Comparative Example |
|---|---|---|---|---|---|
| | 1 | 2 | 3 | 4 | 1 |
| (Modified) cyclized rubber | A | B | C | D | — |
| Weight-average molecular weight | 134,800 | 73,000 | 113,800 | 76,000 | — |
| Cyclization ratio (%) | 74 | 75 | 79 | 75 | — |
| Polar group content (mmol/100 g) | | | | | |
| Acid anhydride group | — | — | 23 | — | — |
| Carboxyl group | — | — | 25 | — | — |
| Hydroxyl group | — | — | — | 36 | — |
| Adhesiveness of the thin film | ○ | ○ | ○ | ○ | x |

Example 5

The cyclized rubber C was dissolved into a mixed solution in which toluene/ethyl acetate=3/1 (ratio by weight), so as to give a concentration of 2%, thereby preparing a primer.

Pellets made of a thermoplastic saturated norbornene resin (ZEONEX 280, manufactured by ZEON CORPORATION, number-average molecular weight: about 28,000, glass transition temperature: 140° C.) were dried at 90° C. for 3 hours, and then injection-molded at a mold temperature of 100° C. and a resin temperature of 290° C. to give a 20 mm×50 mm×50 mm molded plate.

The above-mentioned primer was applied onto the molded plate with a spin coater, and then heated and dried at 80° C. The film thickness of the primer layer was about 5 μm.

By sputtering using a high frequency power source of 13.56 MHz frequency, a silicon oxide (SiOx) of 30 nm thickness was formed on the surface of this primer layer. Conditions for the film formation were as follows: reactive sputtering with oxygen using silicon having a purity of 99.99% as a target was used to form the film for 5 minutes at a pressure of 0.2 Pa and an applying electric power of 120 W at the time of the film-formation. This laminate was heat-treated at 90° C. for 60 minutes, and then naturally cooled to room temperature.

The adhesiveness of the silicon oxide thin film in the resultant test piece was evaluated by the check pattern test. As a result, the score was 100, and the adhesiveness was good.

Comparative Example 2

The same way as in Example 5 was performed without applying any primer, so as to yield a test piece in which a silicon oxide (SiOx) thin film of 30 nm thickness was formed on a molded plate. The adhesiveness of the silicon oxide thin film in this test piece was evaluated by the check pattern test. As a result, the score was 0, and the silicon oxide thin film was peeled. The adhesiveness was very poor.

B. Laminates of the Second Embodiment

Example 6

Five parts of the cyclized rubber A, 95 parts of polypropylene (F-200S, manufactured by Idemitsu Kosan Co., Ltd.) and 0.01 part of Irganox 1010 (manufactured by Chiba Specialty Chemicals) were mixed in a Henschel mixer, and then a biaxial extruder was used to melt and knead the mixture at 200° C. to yield pellets. A monoaxial extruder was used to extrude the pellets from a multi-manifold shaped T die at a resin temperature of 250° C. and a cooling roll temperature of 30° C., thereby yielding a sheet of 1000 μm thickness. This sheet was drawn 5 times in the lengthwise direction with a drawing roll heated to 125° C., and next the sheet was drawn 10 times in the lateral direction in a tenter in which hot wind of 155° C. temperature was circulated. Furthermore, the sheet was thermally set at 70° C. for 2 seconds to yield a biaxial-oriented film. The thickness of the film was 25 μm.

A winding type vacuum evaporation device was used, SiO (manufactured by SUMITOMO TITANIUM CORPORATION) was used as a vapor-deposited material, and this was vaporized onto a face of the resultant film in a high-frequency heating manner. Under a condition that the pressure was $8 \times 10^{-5}$ Torr, a silicon oxide film of 25 nm thickness was laminated onto the face.

The adhesiveness of the silicon oxide film in the resultant laminate film was evaluated by observation with a transmission electron microscope. The result is shown in Table 2.

Examples 7 to 9

The same way as in Example 6 was performed except that the cyclized rubber A was changed into each of the (modified) cyclized rubbers B to D, so as to yield laminates in which a silicon oxide film was laminated. The adhesiveness of the silicon oxide film in each of the films was evaluated by observation with a transmission electron microscope. The results are shown in Table 2.

Comparative Example 3

A laminate film in which a silicon oxide film was laminated was yielded in the same way as in Example 6 except that the cyclized rubber A was not incorporated and the amount of the incorporated polypropylene (F-200S, manufactured by Idemitsu Kosan Co., Ltd.) was changed into 100 parts. The adhesiveness of the silicon oxide film in this film was evaluated by observation with a transmission electron microscope. The result is shown in Table 2.

TABLE 2

|  | Example | | | | Comparative Example |
|---|---|---|---|---|---|
|  | 6 | 7 | 8 | 9 | 3 |
| (Modified) cyclized rubber | A | B | C | D | — |
| Adhesiveness of the thin film | ○ | ○ | ○ | ○ | x |

It is understood from Table 2 that the oriented film of polypropylene into which no cyclized rubber was incorporated was a laminate very poor in adhesiveness to the silicon oxide thin film (Comparative Example 3) while the oriented films of polypropylene in which the cyclized rubber of the present invention was incorporated were good in adhesiveness to the silicon oxide thin film (Examples 6 to 9).

C. Others

Examples in which an amorphous carbon film was used as a thin film in the first and second embodiments will be shown hereinafter so as to describe the present invention in more detail. Analysis and evaluation were made as follows:

(6) Weight-Average Molecular Weight (Mw) of Each Polymer

It was obtained by the same method as described above.

(7) Cyclization Ratio of Each Conjugated Diene Polymer Cyclized Product (Cyclized Rubber)

At each of times before and after cyclization reaction of each conjugated diene polymer, the peak area of protons originating from the double bonds therein was measured by proton NMR analysis; the percentage of the double bonds remaining in the cyclized product was obtained by regarding the area before the cyclization reaction as 100; and the cyclization ratio (%) was calculated from the calculation equation=(100−the percentage of the double bonds remaining in the cyclized product).

(8) Amount of Gel in Each Polymer

After 0.2 g of each polymer was immersed into 200 mL of toluene for 48 hours, the ratio (%) by weight of insoluble contents (dry solid contents) remaining without being dissolved in toluene was obtained.

(9) Amount of Polar Groups in Each Modified Conjugated Diene Polymer Cyclized Product (Modified Cyclized Rubber)

The carboxyl group amount therein was obtained from the acid value thereof.

Acid value: the acid value of each modified polymer was measured in accordance with a method described in "Standard Oil and Fat Analysis Test Method" (Japan Oil Chemists' Society) 2, 4, 1-83.

(10) Check Pattern Test (Adhesiveness Test)

An amorphous carbon film was formed on a surface of each substrate, and subsequently the amorphous carbon film was cut at intervals of 2 mm with a cutter, so as to have 11 cuts reaching the substrate. Eleven cuts which were equivalent thereto but perpendicular thereto was made. In this way, 100 squares having sides 2 mm in length were made. A cellophane adhesive tape was stuck closely to the squares, and then the adhesive tape was pulled and peeled forward at an angle of 45° to the squares. The number of squares in which the coated face remained was counted and evaluated Based on the following three ranks:

○: 50 or more/100,

Δ: 30/100 to 49/100, and x: 29 or less/100, samples in which the carbon film was peeled at the time of the cutting with the cutter, and samples in which no amorphous carbon film was able to be formed.

Synthesis Example 5

Into a pressure resistant reactor equipped with a stirrer, a thermometer, a reflux condenser and a nitrogen gas introducing tube were charged 300 parts of polyisoprene (cis-1,4-isoprene units: 73%, trans-1,4-isoprene units: 22%, 3,4-isoprene units: 5%, weight-average molecular weight: 174,000) cut into pieces 10 mm cubic together with 700 parts of toluene. The reactor was purged with nitrogen, and then heated to 80° C. While the solution was stirred, the polyisoprene was dissolved into toluene. After the polyisoprene was completely dissolved, 2.07 parts of p-toluenesulfonic acid (anhydrous) were charged into the solution. While the solution was kept at 80° C. and continuously stirred, cyclization reaction was conducted. After about 4 hours, an aqueous solution in which 0.80 part of sodium carbonate was dissolved in 4 parts of water was charged into the solution to quench the reaction. The solution was stirred at 80° C. for 30 minutes. Thereafter, 2 parts of a filtration aid (Radio Light) were added thereto, and a filter having pores of 1 μm diameter was used to remove the residue of the catalyst.

To this solution was added 0.3 part of an age resistor (Irganox 1010, manufactured by Chiba Specialty Chemicals), and then toluene was removed while the solution was stirred at 160° C. When the concentration of solid contents turned into 70%, the solution was poured into a vat made of tetrafluoroethylene resin. The resultant was dried under a reduced pressure at 75° C. so as to yield a cyclized rubber E.

The cyclized rubber E had a weight-average molecular weight of 134,800, a cyclization ratio of 74%, and a gel amount of 0%.

(Synthesis 6)

Into a pressure resistant reactor equipped with a stirrer, a thermometer, a reflux condenser and a nitrogen gas introducing tube were charged 300 parts of polyisoprene (cis-1,4-isoprene units: 70%, trans-1,4-isoprene units: 24%, 3,4-isoprene units: 6%, weight-average molecular weight: 141,000) cut into pieces 10 mm cubic together with 700 parts of toluene. The reactor was purged with nitrogen, and then heated to 80° C. While the solution was stirred, the polyisoprene was dissolved into toluene. After the polyisoprene was completely dissolved, 2.69 parts of p-toluenesulfonic acid (anhydrous) were charged into the solution. While the solution was kept at 80° C. and continuously stirred, cyclization reaction was conducted. After about 4 hours, an aqueous solution in which 1.03 parts of sodium carbonate were dissolved in 5.2 parts of water was charged into the solution to quench the reaction. The solution was stirred at 80° C. for 30 minutes. Thereafter, 2 parts of a filtration aid (Radio Light) were added thereto, and a filter having pores of 1 μm diameter was used to remove the residue of the catalyst.

To this solution was added 0.3 part of an age resistor (Irganox 1010, manufactured by Chiba Specialty Chemicals), and then toluene was removed while the solution was stirred at 180° C. When the concentration of solid contents turned into 70% by weight, 9.0 parts of maleic anhydride were charged into the solution. While the temperature was kept, reaction was continued for 1 hour. Next, unreacted maleic anhydride and toluene were removed while nitrogen was caused to flow at 180° C. Thereafter, the resultant was poured into a vat made of tetrafluoroethylene resin. The resultant was dried under a reduced pressure at 75° C. so as to yield a modified cyclized rubber F.

The cyclized rubber F had a weight-average molecular weight of 113,800, a cyclization ratio of 79%, and a gel amount of 0%. The amount of the carboxyl group added to the modified cyclized rubber F was 38 mmol per 100 g of the polymer.

Examples 10 to 14

A polymer-molding material shown in Table 3 was injection-molded to form two kinds of molded plates (3 mm thick×50 mm wide×80 mm long).

TABLE 3

| Substrate | Polymer-molding material |
|---|---|
| X | Polypropylene resin (J-3054HP, manufactured by Idemitsu Kosan Co., Ltd.) |
| Y | Hydrogenated ring-opened polymer composed of 15% by weight of ethyltetracyclododecene units and 85% by weight of dicyclopentadiene units (Tg: 103° C., hydrogenation ratio: 99% or more) |

The cyclized rubbers E and F were each used and mixed with components in accordance with each primer prescription shown in Table 4 by means of a high-speed stirrer (DISPER) for 10 minutes. Thereafter, the mixtures were each diluted with toluene to set the fluidity thereof into a flow-down time of 13 to 14 seconds, thereby preparing two kinds of primers E and F. The flow-down time is a flow-down time at 20° C. in accordance with the Ford cup No. 4 method prescribed in JIS K 5400.

TABLE 4

|  | Primer E | Primer F |
|---|---|---|
| Primer prescription (parts) | | |
| Cyclized rubber E | 15 | — |
| Cyclized rubber F | — | 15 |
| Titanium oxide | 15 | 15 |
| Xylene | 70 | 70 |

The molded plates X and Y were well washed with water, and dried. A spray gun having a diameter of 1.0 mm was used to apply one of the primers onto a surface of one of the plates in accordance with each combination shown in Table 5 at a spray pressure of 3.5 to 5.0 MPa, so as to give a film thickness of 10 μm after the drying of the primer, and then the primer was dried.

Next, acetylene gas was used as a raw gas, and plasma ion implantation was performed at an initial reduced pressure of $2\times10^2$ Pa so as to yield a laminate in which an amorphous carbon film was formed on the surface of the primer layer, the film thickness of the film being set to each film thickness shown in Table 5. The resultant laminates were subjected to the check pattern (adhesiveness) test. The results are shown in Table 5.

Comparative Example 4

A laminate in which an amorphous carbon film was formed was yielded in the same way as in Example 10 except that no primer containing a cyclized rubber was applied. This laminate was subjected to the check pattern (adhesiveness) test. The results are shown in Tables 5 and 6.

TABLE 5

|  | Example | | | | | Comparative Example |
|---|---|---|---|---|---|---|
|  | 10 | 11 | 12 | 13 | 14 | 4 |
| Polymer substrate | X | X | X | X | Y | X |
| Primer type | E | E | E | F | F | — |
| Amorphous carbon film thickness (μm) | 0.1 | 0.5 | 1 | 1 | 1 | 0.1 |
| Adhesiveness | ○ | ○ | ○ | ○ | ○ | x |

Examples 15 and 16

Blend components were mixed in a Henschel mixer in accordance with each blend prescription shown in Table 6, and the mixture was introduced into a biaxial extruder (35 mm in diameter), and kneaded at 200° C. and a screw rotation number of 2000 rpm to yield pellets of a polymer substrate composition. Next, the pellets were used and injection-molded to form a molded plate 3 mm thick×50 mm wide×80 mm long.

Acetylene gas was used as a raw gas, and plasma ion implantation was performed at an initial reduced pressure of $2\times10^2$ Pa so as to yield a laminate in which an amorphous carbon film 1 μm thick was formed on the surface of the molded plate. The resultant laminate was subjected to the check pattern (adhesiveness) test. The results are shown in Table 6.

TABLE 6

|  | Example | | Comparative Example |
|---|---|---|---|
|  | 15 | 16 | 4 |
| Polymer substrate composition (parts) | | | |
| Polypropylene resin *1 | 95 | 95 | 100 |
| Cyclized rubber E | 5 | — | — |
| Cyclized rubber F | — | 5 | — |
| Age resistor *2 | 0.1 | 0.1 | — |
| Amorphous carbon film thickness (μm) | 1 | 1 | 0.1 |
| Adhesiveness | ○ | ○ | x |

*1: J-3054HP (manufactured by Idemitsu Kosan Co., Ltd.)
*2: Irganox 1010 (manufactured by Chiba Specialty Chemicals)

From Tables 5 and 6, the following are understood.

The laminate of Comparative Example 4, in which the amorphous carbon film was formed on the surface of the polymer substrate made only of polypropylene resin without applying any primer, was very poor in the adhesiveness of the amorphous carbon film.

Against Comparative Example 4, the laminates comprising the primer layer containing the cyclized rubber and the laminates of the polymer substrate into which the cyclized rubber was incorporated were good in the adhesiveness of the amorphous carbon film (Examples 10 to 16). Furthermore, the cases where the film thickness of the amorphous carbon film was made large were also good in the adhesiveness of the amorphous carbon film (Examples 11 to 16).

Industrial Applicability

The laminate of the present invention can be applied, as a plastic molded product subjected to surface treatment for decorative property, gas barrier property, light-blocking property, transparency, chemical resistance, corrosion resistance and others, to various articles such as various containers and wrapping materials.

The invention claimed is:

1. A process for producing a laminate, comprising the step of laminating a thin film, on a surface of a polymer substrate produced by incorporating a cyclized rubber, which is a conjugated diene polymer cyclized product or a derivative thereof, into a polymer-molding material made of a non-polar hydrocarbon resin, by a dry film-forming method,
wherein the film thickness of the thin film is from 1 nm to 100 μm; and a cyclization ratio of the cyclized rubber is from 60% to 90%.

2. The process for producing a laminate according to claim 1, wherein the weight-average molecular weight of the cyclized rubber is from 1,000 to 1,000,000.

3. The process for producing a laminate according to claim 1, wherein the amount of gel in the cyclized rubber is 10% or less by weight.

4. The process for producing a laminate according to claim 1, wherein the cyclized rubber is the derivative of the conjugated diene polymer cyclized product, and further wherein the derivative of the conjugated diene polymer cyclized product is a compound produced by introducing a polar group into the conjugated diene polymer cyclized product by a modifying reaction using a polar-group-containing compound.

5. The process for producing a laminate according to claim 4, wherein the polar group is at least one group selected from the group consisting of an acid anhydride group, a carboxyl group, a hydroxyl group, an ester group, an epoxy group, and an amino group.

6. The process for producing a laminate according to claim 4, wherein the ratio of the introduced polar group is from 0.1 to 200 millimoles per 100 g of the cyclized rubber.

7. The process for producing a laminate according to claim 1, wherein the incorporated amount of the cyclized rubber is from 0.1 to 50 parts by weight for 100 parts by weight of the polymer-molding material.

8. The process for producing a laminate according to claim 1, wherein the polymer which constitutes the polymer-molding material is a linear olefin resin or a cyclic olefin resin.

9. The process for producing a laminate according to claim 1, wherein the thin film is made of aluminum, nickel, zirconium, gold, copper, titanium, chromium, a metal oxide, a metal nitride, or an amorphous carbon film.

10. The process for producing a laminate according to claim 1, wherein the cyclized rubber is obtained by dissolving a conjugated diene polymer into a hydrocarbon solvent, causing the conjugated diene polymer to react in the presence of an acid catalyst, subsequently inactivating the acid catalyst, and removing the residue of the acid catalyst and the hydrocarbon solvent.

* * * * *